(12) United States Patent
Woodhouse et al.

(10) Patent No.: US 8,888,160 B2
(45) Date of Patent: Nov. 18, 2014

(54) SEATING ARRANGEMENT FOR A PASSENGER VEHICLE

(71) Applicant: Ford Global Technologies, LLC, Dearborn, MI (US)

(72) Inventors: David Woodhouse, Bromsgrove (GB); Tosten Gerhardt, London (GB); Robert Spahl, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/076,969

(22) Filed: Nov. 11, 2013

(65) Prior Publication Data

US 2014/0152043 A1    Jun. 5, 2014

(30) Foreign Application Priority Data

Dec. 4, 2012 (GB) .................................. 1221811.1
Oct. 16, 2013 (GB) .................................. 1318277.9

(51) Int. Cl.
 *B60N 2/01* (2006.01)
(52) U.S. Cl.
 CPC ........................................ *B60N 2/01* (2013.01)
 USPC ............................................ 296/64; 297/232
(58) Field of Classification Search
 USPC ........ 296/64, 37.1, 35.2, 204, 186.1; 297/232
 See application file for complete search history.

(56) References Cited

U.S. PATENT DOCUMENTS

| | | | |
|---|---|---|---|
| 3,685,854 A | 8/1972 | Cadiou | |
| 4,218,092 A | 8/1980 | Schach et al. | |
| 5,435,624 A | 7/1995 | Bray et al. | |
| 5,456,019 A | 10/1995 | Dowell et al. | |
| 5,737,845 A | 4/1998 | Marasus | |
| 8,523,281 B2 | 9/2013 | Wahls | |
| 2007/0241235 A1 | 10/2007 | Atchison | |

FOREIGN PATENT DOCUMENTS

| | | |
|---|---|---|
| DE | 19702572 A1 | 2/1998 |
| DE | 19916179 A1 | 10/2000 |
| DE | 102007060818 A1 | 6/2009 |
| EP | 0669245 A1 | 8/1995 |
| FR | 2826616 A1 | 1/2003 |
| FR | 2961142 A1 | 12/2011 |
| GB | 1012559 | 8/1964 |
| GB | 1358783 | 7/1974 |
| WO | 8200618 | 3/1982 |
| WO | 9903377 A1 | 1/1999 |
| WO | 2008110814 A2 | 9/2008 |
| WO | 2009083773 A1 | 7/2009 |
| WO | 2013111167 A1 | 8/2013 |

OTHER PUBLICATIONS

Madabout News, "MEV announce the new R2," Dec. 12, 2007 (3 pages), madabout kitcars.com.

(Continued)

*Primary Examiner* — Pinel Romain
(74) *Attorney, Agent, or Firm* — Vichit Chea; Price Heneveld LLP

(57) ABSTRACT

A seating assembly for a vehicle includes a single occupancy front seat configured for use by a driver of the vehicle. A single occupancy rear seat is configured for use by a passenger of the vehicle and arranged in a staggered relationship with respect to the front seat. A child seat is mounted asymmetrically on the rear seat such that the child seat is positioned further from the front seat than it would be if symmetrically mounted on the rear seat. Mountings secure the child seat on the rear seat and are positioned to mount the child seat asymmetrically on the rear seat.

17 Claims, 4 Drawing Sheets

(56) References Cited

OTHER PUBLICATIONS

Honest John, "Volkswagen unveils XL1 concept car," Jan. 25, 2011 (3 pages), honestjohn.co.uk.
Chappell, Dale, "Bugatti Type 23 'Brescia', staggered seating detail, c1926," Feb. 1, 2011 (2 pages), Chappells 10.
Quick, Darren, "Audi urban concept defies conventional categorization," Aug. 9, 2011 (9 pages), Gizmag.
Taylor, Alfred, "Amazing world of three-wheeled vehicles," Sep. 22, 2011 (18 pages), Judgmental.
SAE International, "Devices for Use in Defining and Measuring Vehicle Seating Accommodation," 2014 (1 page).
jalopy journal.com, "An Early Factory Hot Rod, the Jesse Vincent Speedster," date unknown (13 pages), Lexis Legal Community.
Early american automobiles.com, "History of Early American Automobile Industry 1891-1929," date unknown (30 pages).
USPTO, Office Action for U.S. Appl. No. 14/076,919, dated May 22, 2014 (11 pages).

SEATING ARRANGEMENT FOR A PASSENGER VEHICLE

CROSS-REFERENCE TO RELATED APPLICATIONS

The present application is related to co-pending U.S. patent application Ser. No. 14/076,919, filed Nov. 11, 2013, entitled "SEATING ARRANGEMENT FOR A PASSENGER VEHICLE"; co-pending U.S. patent application Ser. No. 14/076,928, filed Nov. 11, 2013, entitled "SEATING ARRANGEMENT FOR A PASSENGER VEHICLE"; co-pending U.S. patent application Ser. No. 14/076,942, filed Nov. 11, 2013, entitled "MOTOR VEHICLE SEAT HAVING AN ARMREST"; co-pending U.S. patent application Ser. No. 14/076,954, filed Nov. 11, 2013, entitled "SEATING ARRANGEMENT FOR A PASSENGER VEHICLE"; and co-pending U.S. patent application Ser. No. 14/076,964, filed Nov. 11, 2013, entitled "SEATING ARRANGEMENT FOR A PASSENGER VEHICLE", all of which are incorporated herein by reference in their entireties.

FIELD OF THE INVENTION

The present invention generally relates to a seating arrangement for a powered passenger vehicle and, in particular, to the fitment of a child seat to a vehicle having small overall dimensions.

BACKGROUND OF THE INVENTION

A common problem faced by modern car users is the lack of parking space in cities and large towns. In an effort to provide more parking there has been a trend by local authorities to reduce the size of parking bays so as to provide more parking bays along a given length of road.

SUMMARY OF THE INVENTION

According to one aspect of the present invention, a seating assembly for a vehicle includes a single occupancy front seat configured for use by a driver of the vehicle. A single occupancy rear seat is configured for use by a passenger of the vehicle and arranged in a staggered relationship with respect to the front seat. A child seat is mounted asymmetrically on the rear seat such that the child seat is positioned further from the front seat than it would be if symmetrically mounted on the rear seat. Mountings secure the child seat on the rear seat and are positioned to mount the child seat asymmetrically on the rear seat.

According to another aspect of the present invention, a seating assembly for a vehicle includes a single occupancy front seat for a driver of the vehicle. A single occupancy rear seat for a passenger of the vehicle is arranged in a staggered relationship with respect to the front seat. A child seat is mounted asymmetrically on the rear seat such that the child seat is positioned further from the front seat than it would be if symmetrically mounted on the rear seat.

According to yet another aspect of the present invention, a seating assembly for a vehicle includes a stepped floor positioned in the vehicle and defining upper and lower portions. A single occupancy front seat for a driver of the vehicle. The front seat is positioned on the lower portion. A single occupancy rear seat for a passenger of the vehicle is arranged in a staggered relationship with respect to the front seat. The rear seat is positioned on the upper portion. A child seat is mounted asymmetrically on the rear seat such that the child seat is positioned further from the front seat than it would be if symmetrically mounted on the rear seat.

It is a first object of the invention to provide a seating arrangement to facilitate the fitting of a child seat to a rear seat of a two seat staggered seating arrangement that overcomes the above indicated problem.

According to a first aspect of the invention there is provided a motor vehicle seating arrangement having a single occupancy front seat for a driver of the vehicle, a single occupancy rear seat for a passenger of the vehicle arranged in a staggered relationship with respect to the front seat, wherein the seating arrangement includes a child seat mounted asymmetrically on the rear seat so as to position the child seat in a transverse direction further from the front seat than it would be if symmetrically mounted on the rear seat.

Mountings may be provided for mounting the child seat on the rear seat and the mountings may be positioned so as to mount the child seat asymmetrically on the rear seat.

The rear seat may have a central axis and the mountings for the child seat may be offset with respect to the central axis of the rear seat so as to enable the child seat to be asymmetrically mounted on the rear seat.

The rear seat may include a frame and the child seat mountings may be attached to the frame of the rear seat.

The mountings may include a pair of spaced apart lower mountings attached to the frame of the rear seat.

According to a second aspect of the invention there is provided a compact passenger vehicle having a source of motive power and a seating arrangement constructed in accordance with said first aspect of the invention located in a passenger compartment of the vehicle.

The vehicle may have a central longitudinal axis, the rear seat may have a central axis, the child seat may have a central axis and the central axis of the child seat may be offset from the central axis of the passenger seat so as to mount the child seat further away from the central longitudinal axis of the vehicle than it would be if the central axes of the child seat and the rear seat are positioned the same distance from the central longitudinal axis of the vehicle.

The rear seat may include a frame, the child seat mountings may be attached to the frame of the rear seat and the mountings may be positioned so as to mount the child seat on the rear seat in a transversely offset outboard position relative to the central axis of the rear seat.

The mountings may include a pair of spaced apart lower mountings attached to the frame of the rear seat.

The motor vehicle may include a body structure, the mountings for the child seat may be attached to the body structure of the vehicle and the mountings may be positioned so as to mount the child seat on the rear seat in a transversely offset outboard position relative to a central axis of the rear seat.

These and other aspects, objects, and features of the present invention will be understood and appreciated by those skilled in the art upon studying the following specification, claims, and appended drawings.

BRIEF DESCRIPTION OF THE DRAWINGS

The invention will now be described by way of example with reference to the accompanying drawing of which.

DETAILED DESCRIPTION OF THE EMBODIMENTS

Figure 1:
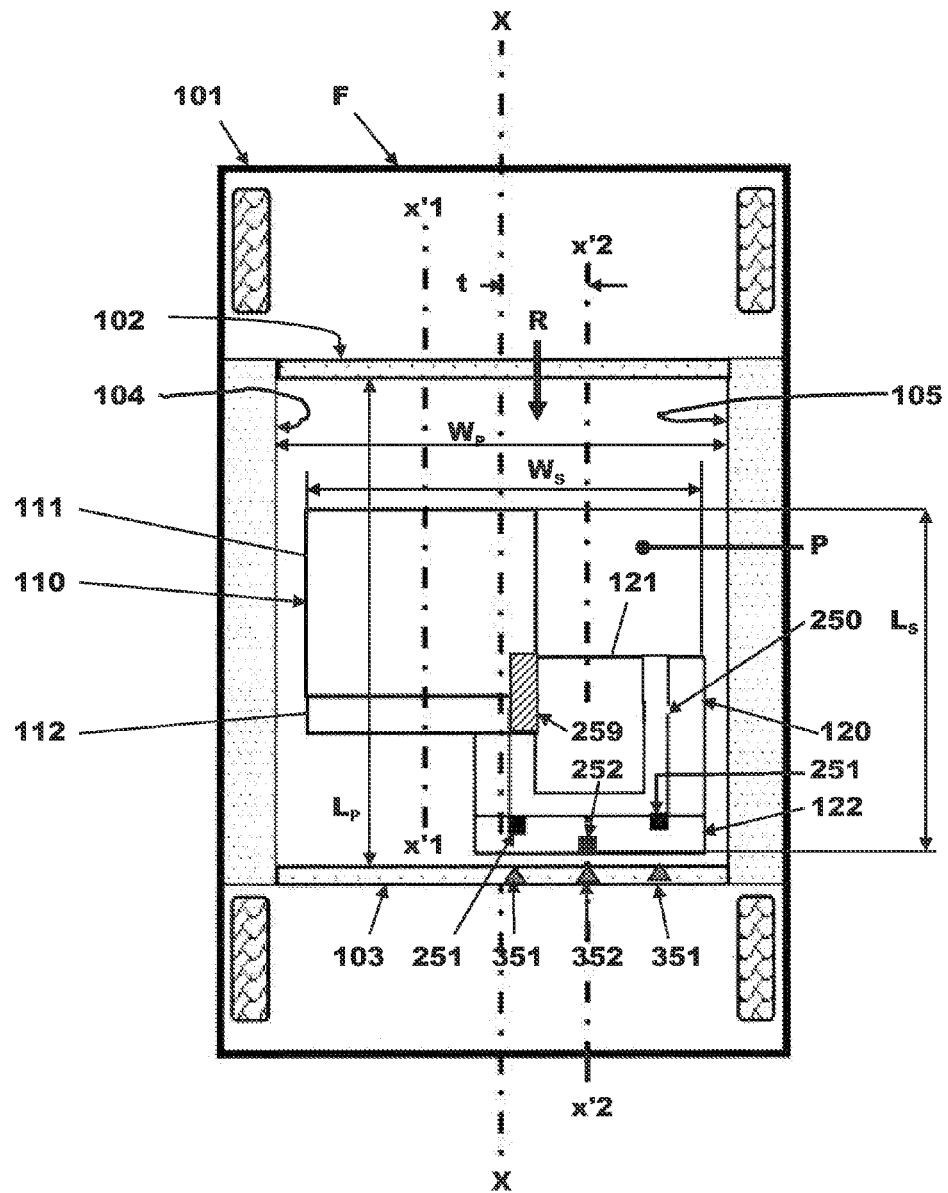
FIG. 1 is a schematic plan view of a motor vehicle having a staggered seating arrangement having front and rear seats showing how a child seat if mounted symmetrically on the rear seat is unable to be accommodated.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With particular reference to FIG. 1 there is shown a staggered seating arrangement for a passenger vehicle in the form of a car 101. The seating arrangement is located in a passenger compartment 'P' of the vehicle 101.

The passenger compartment P of the motor vehicle 101 is defined by a front wall 102, two side walls 104, 105 and a rear wall 103.

The motor vehicle 101 has in this case four wheels connected to the body structure via a conventional suspension system. The vehicle 101 has a central longitudinal axis X-X that extends from a front end F of the vehicle 101 to a rear end of the vehicle 101.

The passenger compartment P has a width $W_P$ and a length $L_P$. The width and length $W_P$ and $L_P$ of the passenger compartment will affect the overall width and length of the vehicle 101 and so it is desirable to reduce the width and the length $W_P$ and $L_P$ of the passenger compartment P.

It will be appreciated that the vehicle 101 could be powered by any known source of motive power including, but not limited to, a combustion engine, an electric motor or a combination of same. The source of motive power can be mounted at any convenient location and can drive the vehicle 1 by any suitable form of transmission. It will also be appreciated that the motor vehicle could have three wheels or more than four wheels.

The seating arrangement includes a front seat 110 and a rear seat 120 arranged in a staggered relationship to one another. That is to say, the front and rear seats 110 and 120 are offset in a longitudinal direction a stagger distance which is typical measured between respective H-points for the two seats 110, 120.

The front seat 110 is mounted in the vehicle 1 forward relative to the rear seat 120 by an amount equal to the respective longitudinal stagger distance between them. The front seat 110 is a seat for a driver of the vehicle 101 and the rear seat 120 is a seat for a passenger of the vehicle 101. A stagger distance S of 0.3 to 0.35 m has been shown to provide a good compromise between vehicle compactness that is to say, passenger compartment length $L_P$, and comfort for the occupants.

The front seat 110 has a seat cushion or squab 111 and a backrest 112 arranged at an obtuse angle with respect to the seat squab 111. The seat squab 111 is attached to a floor of the vehicle 101 by means of a seat mounting structure.

The rear seat 120 has, like the front seat 110, a seat cushion or squab 121 and a backrest 122 arranged at an obtuse angle with respect to the seat squab 121. The seat squab 121 is attached to the floor of the vehicle 101 by means of a seat mounting structure.

The magnitude of the longitudinal stagger between the front and rear seats is in this case such that at least part of a front edge of the rear seat 120 overlaps with part of a rear edge of the front seat 110. This permits a short cabin length $L_P$ because a distance $L_S$ between a front edge of the front seat squab 111 and the rear edge of the rear seat squab 121 is less than the sum of the two longitudinal lengths of the respective seat squabs 111, 121.

The front and rear seats 110 and 120 are also overlapped in a transverse direction of the motor vehicle 101 by moving a respective central axis x'1-x'1 and x'2-x'2 of the front and rear seats 110 and 120 closer together so that the distance between the two central axes x'1-x'1 and x'2-x'2 is less than the sum of half the widths of the respective seats 110, 120 at the same location. By overlapping the front and rear seats in a transverse direction the width $W_P$ of the passenger compartment P can be reduced.

Figure 3:
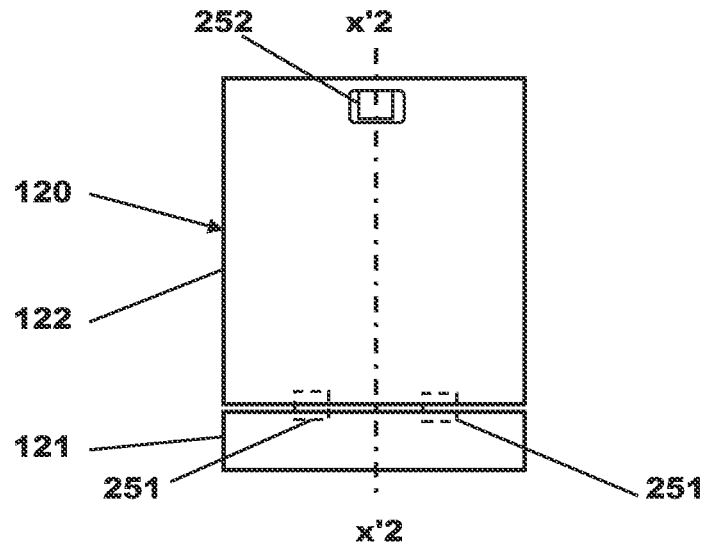
FIG. 3 is a schematic view in the direction of arrow 'R' on FIG. 1 showing the position of conventional child seat mountings on the rear seat.

FIGS. 1 and 3 show the situation if a child seat 250 is mounted on the rear seat 120 so as to be symmetrically mounted thereupon. In such a case a central axis x3-x3 of the child seat 250 is aligned with the central axis x'2-x'2 of the rear seat 120. (The axis x3-x3 is not visible on FIG. 1 because it is coincident with the axis x'2-x'2).

That is to say, the axes x'2-x'2 and x3-x3 are both spaced the same distance from the central longitudinal axis X-X of the vehicle 101 and lower and upper child seat mountings 251 and 252 are attached to frame parts of the rear seat 120 with the two mountings 251 being fixed so that they are equally spaced on either side of the central axis x'2-x'2 of the rear seat 120. The upper child seat mounting 252 is aligned with the central axis x'2-x'2 of the rear seat 120. This arrangement of child seat mountings 251, 252 symmetrically positions the child seat 250 on the rear seat 120.

Figure 5:
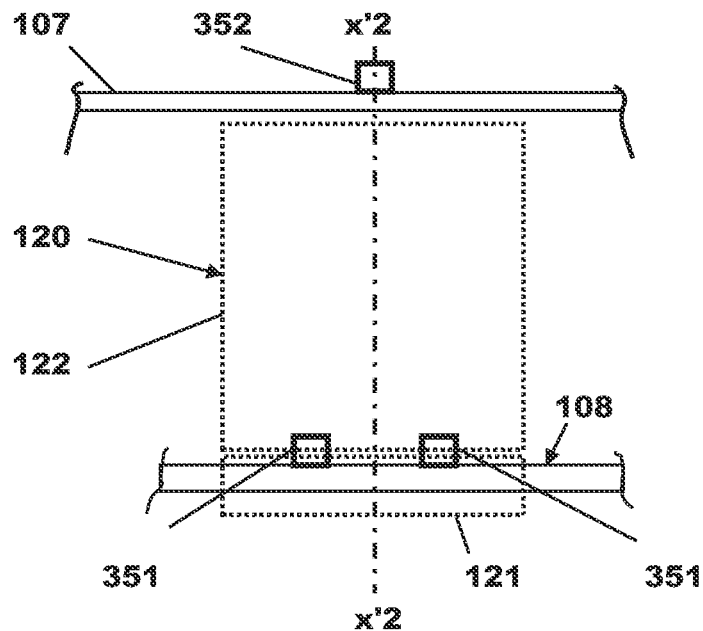
FIG. 5 is a schematic view in the direction of arrow 'R' on FIG. 1 showing the position of conventional child seat mountings on the body structure of the motor vehicle.

Shown in FIGS. 1 and 5 is an alternative embodiment in which the upper and lower child seat mountings are fixed not to the child seat 120 but to respective parts 107, 108 (shown on FIG. 5) of a body structure of the motor vehicle 101.

In this embodiment the lower child seat mountings 351 are attached to a structural part of the motor vehicle 108 such that the two mountings 351 are fixed so as to be equally spaced on either side of the central axis x'2-x'2 of the rear seat 120. The upper child seat mounting 352 is attached to a structural part 107 of the motor vehicle 101 so that it is aligned with the central axis x'2-x'2 of the rear seat 120. This arrangement of child seat mountings 351, 352 also symmetrically positions the child seat 250 on the rear seat 120.

The child seat mountings are shown schematically but are of a conventional design, by way of example and without limitation, European Patent publication 0979752, JP Patent publication 2011-102084 and US Patent publication 2013/0127218 show examples of child seat mountings.

If the child seat 250 were to be symmetrically mounted as shown in FIGS. 1, 3 and 5 interference as shown by the cross-hatched area 259 on FIG. 1 with the backrest 112 of the front seat 110 is difficult to avoid unless either the longitudinal stagger between the two seats 110, 120 is greatly increased or the transverse spacing between the two seats 110, 120 is increased. In either case such increases are not desirable if the vehicle 101 is to maintain the small width and length dimensions for side by side nose-in parking.

It will be appreciated that interference as illustrated by the cross-hatched area 259 indicates that the child seat 250 could not be accommodated on the rear seat 120 in such a case.

Figure 2:
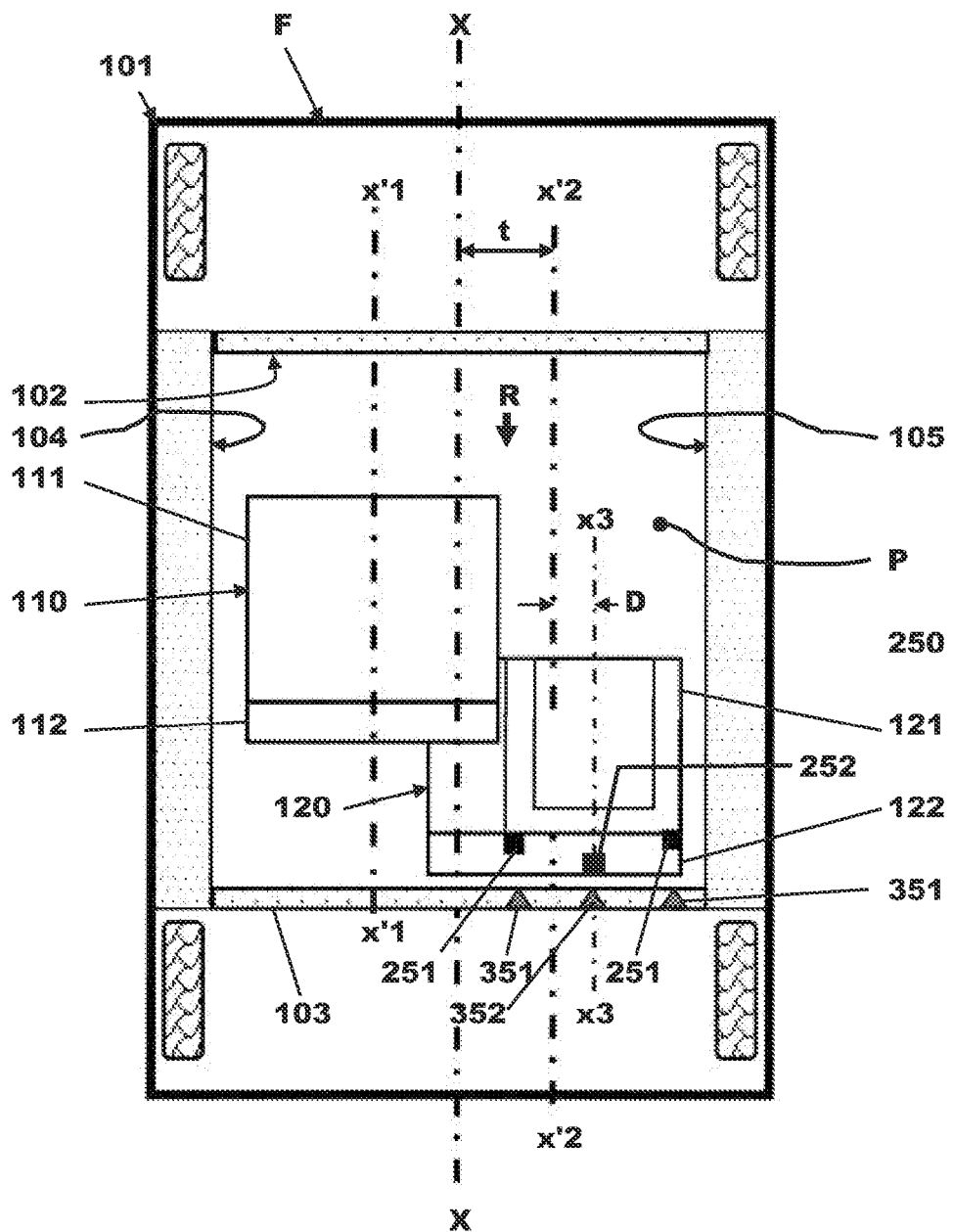
FIG. 2 is a schematic plan view of the motor vehicle shown in FIG. 1 but having a staggered seating arrangement constructed in accordance with the invention.

Therefore in accordance with this invention, in order to overcome this problem while enabling a very compact vehicle 101 to be produced, the child seat 250 is asymmetrically mounted on the rear seat 120 so as to position the child seat 250 further in a lateral direction from the front seat 110 than it would be if symmetrically mounted on the rear seat 120 (See FIG. 2).

Figure 4:
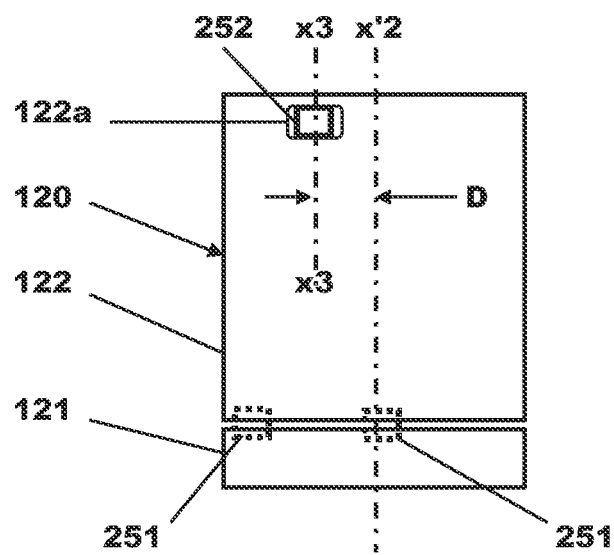
FIG. 4 is a schematic view in the direction of arrow 'R' on FIG. 2 showing the position of the child seat mountings on the rear seat in accordance with one embodiment of the invention.

With reference to FIGS. 2 and 4, Isofix® child seat mountings 251, 252 are, as before, attached to frame parts of the rear seat 120 but in this case the mountings 251, 252 are offset relative to the central axis x'2-x'2 of the rear seat 120 so as to mount the child seat 250 asymmetrically on the rear seat 120 so that it is transversely further away from the front seat 110.

That is to say, the central longitudinal axis x3-x3 of the child seat 250 is offset a distance 'D' from the central axis x'2-x'2 of the passenger seat 120 so as to displace it transversely away from the central longitudinal axis X-X of the vehicle 101 into a more outboard position.

With the child seat 250 mounted laterally more outboard than if mounted symmetrically on the rear seat 120, interference between the child seat 250 and the front seat 110 is avoided.

Figure 6:
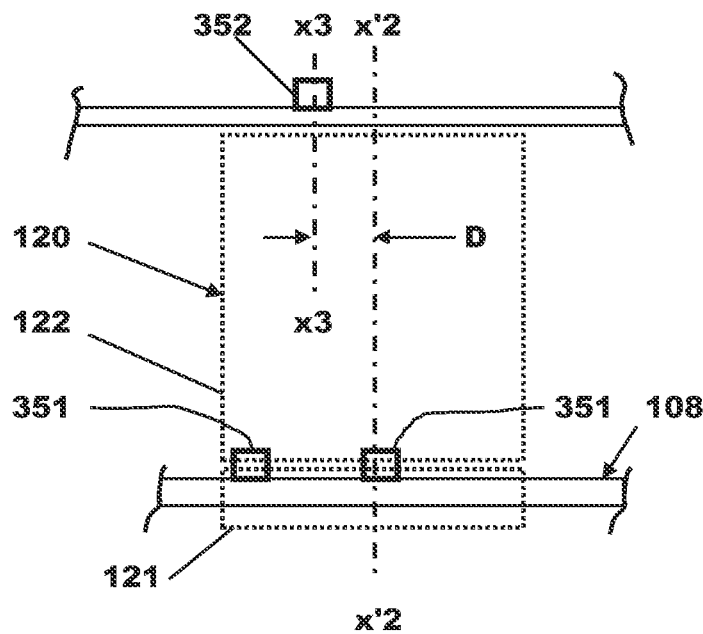
FIG. 6 is a schematic view in the direction of arrow 'R' on FIG. 2 showing the position of the child seat mountings on the body structure of the motor vehicle in accordance with a further embodiment of the invention.

With reference to FIGS. 2 and 6, Isofix® seat mountings 351, 352 are, as before, attached to structural parts 108, 107 of the vehicle 101 but in this case the mountings 351, 352 are offset relative to the central axis x'2-x'2 of the rear seat 120 so as to mount the child seat 250 asymmetrically on the rear seat 120.

The positioning of the child seat mountings 351, 352 is such as to facilitate the central longitudinal axis x3-x3 of the child seat 250 to be offset a distance 'D' outboard from the central axis x'2-x'2 of the passenger seat 120. Therefore, when the child seat 250 is attached to these mountings 351, 352, the child seat 250 will be mounted on the rear seat 120 in a position that is transversely further away from the central longitudinal axis X-X of the vehicle 101 and from the front seat 110. Therefore, with the child seat 250 mounted laterally more outboard than if mounted symmetrically on the rear seat 120, interference between the child seat 250 and the front seat 110 is avoided.

It will be appreciated that the invention is not limited to the use of Isofix mountings and that other types of child seat mounting could be used in a similar manner. It will also be appreciated that the upper mounting for the child seat need not be located above and to the rear of the child seat. For example, some child seat mounting arrangements tether the upper part of the child seat via a mounting located at a lower end of the backrest. Although the invention is particularly advantageous if the front and rear seats overlap both longitudinally and laterally it is also of benefit for other situations. For example, if the child seat extends beyond the front edge of the rear seat squab, then, even if there is no longitudinal overlap, there is potential for interference if the two seats overlap laterally.

Similarly, if the child seat extends beyond the inboard side edge of the rear seat squab, then, even if there is no lateral overlap, there is potential for interference if the two seats overlap longitudinally.

Furthermore, if the child seat extends beyond the front edge of the rear seat squab and extends beyond the inboard side edge of the rear seat squab, there is still the potential for interference even if there is no overlap between the two seats.

The term 'child seat mounting' as used herein is sometimes referred to as a child seat anchor point.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is for illustrative purposes. Although a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A seating assembly for a vehicle comprising:
   a single occupancy front seat configured for use by a driver of the vehicle;
   a single occupancy rear seat configured for use by a passenger of the vehicle and arranged in a staggered relationship with respect to the front seat;
   a child seat mounted asymmetrically on the rear seat such that the child seat is positioned further from the front seat than it would be if symmetrically mounted on the rear seat; and
   mountings that secure the child seat on the rear seat, the mountings being positioned to mount the child seat asymmetrically on the rear seat.

2. The seating assembly of claim 1, wherein the rear seat has a central axis and the mountings for the child seat are offset with respect to the central axis of the rear seat such that the child seat can be asymmetrically mounted on the rear seat.

3. The seating assembly of claim 2, wherein the rear seat includes a frame and the child seat mountings are attached to the frame of the rear seat.

4. The seating assembly of claim 3, wherein the mountings include a pair of spaced apart lower mountings attached to the frame of the rear seat.

5. The seating assembly of claim 4, wherein the child seat mountings are attached to the frame of the rear seat and the mountings are positioned so as to mount the child seat on the rear seat in a transversely offset outboard position relative to the central axis of the rear seat.

6. A seating assembly for a vehicle comprising:
   a single occupancy front seat for a driver of the vehicle;
   a single occupancy rear seat for a passenger of the vehicle arranged in a staggered relationship with respect to the front seat; and
   a child seat mounted asymmetrically on the rear seat such that the child seat is positioned further from the front seat than it would be if symmetrically mounted on the rear seat.

7. The seating assembly of claim 6, further comprising:
   mountings that secure the child seat on the rear seat, the mountings being positioned to secure the child seat asymmetrically on the rear seat.

8. The seating assembly of claim 7, wherein the rear seat has a central axis and the mountings for the child seat are offset with respect to the central axis of the rear seat such that the child seat can be asymmetrically mounted on the rear seat.

9. The seating assembly of claim 8, wherein the rear seat includes a frame and the child seat mountings are attached to the frame of the rear seat.

10. The seating assembly of claim 9, wherein the mountings include a pair of spaced apart lower mountings attached to the frame of the rear seat.

11. The seating assembly of claim 10, wherein the child seat mountings are attached to the frame of the rear seat and the mountings are positioned so as to mount the child seat on the rear seat in a transversely offset outboard position relative to the central axis of the rear seat.

12. A seating assembly for a vehicle comprising:
    a stepped floor positioned in the vehicle and defining upper and lower portions;
    a single occupancy front seat for a driver of the vehicle, the front seat being positioned on the lower portion;
    a single occupancy rear seat for a passenger of the vehicle arranged in a staggered relationship with respect to the front seat, the rear seat being positioned on the upper portion; and
    a child seat mounted asymmetrically on the rear seat such that the child seat is positioned further from the front seat than it would be if symmetrically mounted on the rear seat.

13. The seating assembly of claim 12, further comprising:
    mountings that secure the child seat on the rear seat, the mountings being positioned to secure the child seat asymmetrically on the rear seat.

14. The seating assembly of claim 13, wherein the rear seat has a central axis and the mountings for the child seat are offset with respect to the central axis of the rear seat such that the child seat can be asymmetrically mounted on the rear seat.

15. The seating assembly of claim 14, wherein the rear seat includes a frame and the child seat mountings are attached to the frame of the rear seat.

16. The seating assembly of claim 15, wherein the mountings include a pair of spaced apart lower mountings attached to the frame of the rear seat.

17. The seating assembly of claim 16, wherein the child seat mountings are attached to the frame of the rear seat and the mountings are positioned so as to mount the child seat on the rear seat in a transversely offset outboard position relative to the central axis of the rear seat.

* * * * *